(12) United States Patent
Kim et al.

(10) Patent No.: US 7,452,621 B2
(45) Date of Patent: Nov. 18, 2008

(54) POLYMER MEMBRANE FOR FUEL CELL AND METHOD FOR PREPARING THE SAME

(75) Inventors: Hee-Tak Kim, Suwon-si (KR); Hyoung-Juhn Kim, Suwon-si (KR); Hae-Kwon Yoon, Suwon-si (KR); Ho-Jin Kweon, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 292 days.

(21) Appl. No.: 11/153,699

(22) Filed: Jun. 14, 2005

(65) Prior Publication Data

US 2006/0003209 A1 Jan. 5, 2006

(30) Foreign Application Priority Data

Jun. 30, 2004 (KR) .................. 10-2004-0050771

(51) Int. Cl.
*H01M 4/00* (2006.01)
*H01M 2/14* (2006.01)
*A01K 1/015* (2006.01)
*B32B 3/06* (2006.01)
*B01J 49/00* (2006.01)
*C08J 5/20* (2006.01)
*B05D 5/12* (2006.01)

(52) U.S. Cl. .................. 429/29; 429/33; 429/129; 428/221; 428/306.6; 521/27; 427/115

(58) Field of Classification Search .................. 428/221, 428/293.4, 297.4–299.7, 305.5–308.8, 312.2, 428/312.6, 313.3–314.2, 315.5–316.6; 429/30, 429/33, 142–145, 206, 303–323; 521/25, 521/27, 28, 30–37; 156/60, 276, 305, 314; 427/115
See application file for complete search history.

(56) References Cited

U.S. PATENT DOCUMENTS

| | | | |
|---|---|---|---|
| 5,795,668 A | * | 8/1998 | Banerjee .................. 429/33 |
| 5,858,264 A | | 1/1999 | Ichino et al. |
| 6,042,958 A | * | 3/2000 | Denton et al. .................. 429/30 |
| 6,248,469 B1 | | 6/2001 | Formato et al. |

(Continued)

FOREIGN PATENT DOCUMENTS

JP 2003077494 A * 3/2003

OTHER PUBLICATIONS

IPDL Machine Translation and Abstract in English of JP 2003-077494.*

(Continued)

*Primary Examiner*—Alexa D. Neckel
*Assistant Examiner*—Claire L Rademaker
(74) *Attorney, Agent, or Firm*—Christie, Parker & Hale, LLP (57) ABSTRACT

A polymer electrolyte membrane for a fuel cell includes a porous membrane formed with fine pores, hygroscopic polymer layers coated inside the fine pores of the porous membrane, and proton conductive polymers filled in the fine pores of the porous membrane coated with the hygroscopic polymer layers.

25 Claims, 2 Drawing Sheets

U.S. PATENT DOCUMENTS

| | | |
|---|---|---|
| 6,523,699 B1 | 2/2003 | Akita et al. |
| 6,635,384 B2 * | 10/2003 | Bahar et al. ................. 429/188 |
| 2003/0232184 A1 * | 12/2003 | Morikawa et al. ........ 428/316.6 |
| 2005/0100772 A1 * | 5/2005 | Ono ........................... 429/33 |
| 2005/0158632 A1 * | 7/2005 | Wang Chen et al. ........ 429/309 |
| 2005/0181275 A1 | 8/2005 | Jang |
| 2006/0029841 A1 | 2/2006 | Conrad et al. |
| 2006/0166069 A1 | 7/2006 | Min et al. |

OTHER PUBLICATIONS

Patent Abstracts of Japan, Publication No. 2001-158806; Publication Date: Jun. 12, 2001; in the name of Akita et al.

Chinese Office Action, and English translation, dated Nov. 16, 2007, for the related Chinese Patent Application No. 2005100813756, which discusses U.S. Patent No. 6,523,699 cited in the Jan. 15, 2008 Information Disclosure Statement.

* cited by examiner

POLYMER MEMBRANE FOR FUEL CELL AND METHOD FOR PREPARING THE SAME

CROSS-REFERENCE TO RELATED APPLICATION

This application claims priority to and the benefit of Korean Patent Application No. 10-2004-0050771 filed on Jun. 30, 2004 in the Korean Intellectual Property Office, the entire content of which is incorporated herein by reference.

FIELD OF THE INVENTION

The present invention relates to a polymer electrolyte membrane for a fuel cell and to a method for preparing the same, and more specifically relates to a polymer electrolyte membrane with improved mechanical strength and proton conductivity (or permeability), and a method for preparing the same.

BACKGROUND OF THE INVENTION

A fuel cell is a power generation system for producing electrical energy through a chemical reaction between oxidant and hydrogen or hydrogen contained in a hydrocarbon-based material such as methanol, ethanol, or natural gas.

A fuel cell can be classified into a phosphoric acid type, a fused carbonate type, a solid oxide type, a polymer electrolyte type, or an alkaline type, depending upon the kind of electrolyte used. Although each of these different types of fuel cells operates in accordance with the same basic principles, they may differ from one another in the kind of fuel, the operating temperatures, the catalyst, or the electrolyte used.

Recently, polymer electrolyte membrane fuel cells (PEM-FCs) have been developed. They have power characteristics that are superior to conventional fuel cells, as well as lower operating temperatures, and faster start and response characteristics. Because of this, PEMFCs have a wide range of applications, such as for transportable power sources for automobiles, distributed power sources for residences and public buildings, and small power sources for electronic devices.

A PEMFC is essentially composed of a stack, a reformer, a fuel tank, and a fuel pump. The stack forms a body of the PEMFC, and the fuel pump provides fuel stored in the fuel tank to the reformer. The reformer reforms the fuel to generate hydrogen gas and supplies the hydrogen gas to the stack, where it is electrochemically reacted with oxidant to generate electrical energy.

Alternatively, a fuel cell may be a direct oxidation fuel cell (DOFC) in which liquid methanol fuel is directly introduced to the stack. Unlike a PEMFC, a DOFC does not require a reformer.

In the fuel cell system described above, the stack for generating the electricity has a structure in which several unit cells, each having a membrane-electrode assembly (MEA) and a separator (also referred to as "bipolar plate"), are stacked adjacent one another. The MEA is composed of an anode (referred to also as "fuel electrode" or "oxidation electrode") and a cathode (referred to also as "air electrode" or "reduction electrode") that are separated by a polymer electrolyte membrane.

The separators function both as channels for supplying the fuel and the oxidant required for a reaction to the anode and the cathode, as well as a conductor for serially connecting the cathode and the anode in the MEA or connecting the cathode of the MEA to the anode of a neighboring MEA. The electrochemical oxidation reaction of the fuel occurs on the anode, and the electrochemical reduction reaction of the oxidant occurs on the cathode and as a result of the transfer of the electrons generated by the oxidation/reduction reactions, electrical energy, heat, and water are produced.

As mentioned above, an MEA includes a polymer electrolyte membrane. The polymer electrolyte membrane functions as an electrolyte in the MEA. Commercially available fluoride electrolyte membranes such as a perfluorosulfonic acid ionomer membrane like NAFION® (fabricated by DuPont), FLEMION® (fabricated by Asahi Glass), ACIPLEX® (fabricated by Asahi Chemical), and DOW® XUS (fabricated by Dow Chemical) are often used for the polymer electrolyte membrane.

However, these commercially available polymer electrolyte membranes are known to have weak mechanical strength and to acquire pin holes upon long-term use, thereby causing the fuel to mix with oxidant so that energy converting efficiency and output characteristics are deteriorated. In order to compensate for the weak mechanical strength, a thicker electrolyte membrane is sometimes used, but this use of a thicker electrolyte membrane enlarges the volume of the MEA and increases the proton resistance and the cost of materials.

Further, the commercially available polymer electrolyte membrane may absorb water generated from the cathode of the MEA, thereby expanding its volume, and causing the polymer electrolyte membrane to peel away from the cathode (or anode) or increase the proton resistance of the interface between the cathode (or anode) and the polymer electrolyte membrane.

SUMMARY OF THE INVENTION

An embodiment of the present invention provides a polymer electrolyte membrane for a fuel cell that has good proton conductivity (or permeability) and superior mechanical strength and hygroscopicity.

Another embodiment of the present invention provides a method for preparing the above-mentioned polymer electrolyte membrane for the fuel cell.

One embodiment of the present invention provides a polymer electrolyte membrane for a fuel cell. The polymer electrolyte membrane includes a porous membrane formed with fine pores; hygroscopic polymer layers coated in the fine pores of the porous membrane; and proton conductive polymers in the fine pores of the porous membrane coated with the hygroscopic polymer layers.

One embodiment of the present invention provides a method of preparing a polymer electrolyte membrane for a fuel cell. The method includes: a) preparing a porous membrane formed with a plurality of fine pores; b) coating hygroscopic polymer layers inside the fine pores of the porous membrane; and c) filling proton conductive polymers into the fine pores of the porous membrane coated with the hygroscopic polymer layers.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, only certain exemplary embodiments of the present invention are shown and described, simply by way of illustration. As those skilled in the art would realize, the described exemplary embodiments may be modified in various different ways, all without departing from the spirit or scope of the present invention. Accordingly, the drawings and description are to be regarded as illustrative in nature, and not restrictive.

Figure 1:
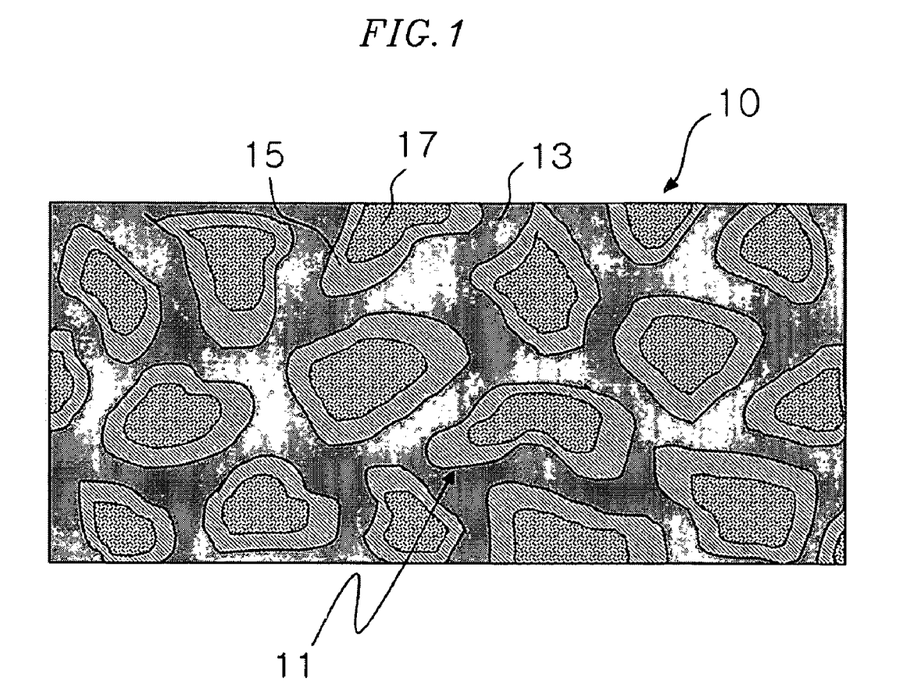
FIG. 1 is a schematic magnified cross-sectional view showing a polymer electrolyte membrane for a fuel cell according to the present invention.

FIG. 1 is a schematic magnified cross-sectional view showing a polymer electrolyte membrane 10 for a fuel cell according to the present invention. As shown in FIG. 1, the polymer electrolyte membrane 10 includes a porous membrane 13 formed with plurality of fine pores 11. Hygroscopic polymer layers 15 are coated in the fine pores 11 of the porous membrane 13 and proton conductive polymers 17 are filled in the fine pores 11 of the porous membrane 13 coated with the hygroscopic polymer layers 15.

A porous membrane of the present invention (e.g., the porous membrane 13 of FIG. 1) has good mechanical strength, thereby improving the dimensional stability of a polymer electrolyte membrane (e.g., the polymer electrolyte membrane 10 of FIG. 1) containing the porous membrane. In addition, the porous membrane of the present invention acts as a frame for preventing volume expansion due to water. According to one embodiment of the invention, fine pores (e.g., the fine pores 11 of FIG. 1) formed in the porous membrane are open-type fine pores which are three-dimensionally connected to each other. Such a pore structure is achieved where the porous membrane is a thin-film or an unwoven fabric formed with open-type fine pores which are three dimensionally connected to each other.

In one embodiment of the invention, the porous membrane has a porosity of between 20 and 70% by volume and preferably between 30 and 60% by volume of the total volume of the porous membrane. When the porosity is less than 20% by volume, it is difficult to accommodate a sufficient amount of the proton conductive polymers in the fine pores. Alternatively, when the porosity is more than 70% by volume, it does not provide a sufficient improvement in the mechanical strength of the porous membrane.

Furthermore in one embodiment of the invention, the fine pores formed in the porous membrane have an average diameter between 0.1 and 10 µm, and preferably between 1 and 5 µm. When the average diameter of the fine pores is less than 0.1 µm, the polymer electrolyte membrane for the fuel cell does not provide sufficient proton conductivity. Alternatively, when the average diameter is more than 10 µm, the uniformity of the pores is deteriorated and the improvement in the mechanical strength of the porous membrane is minimal.

The porous membrane may be a polymer resin having good mechanical strength and a low hygroscopicity for minimizing volume change due to water, and preferably includes at least one polymer or copolymer selected from the group consisting of polyolefin, polyester, polysulfone, polyimide, polyetherimide, polyamide, polytetrafluoroethylene, rayon, glass fiber, and combinations thereof. In one embodiment, the porous membrane includes at least one of rayon and glass fiber because of their good thermostability at high temperature.

The inside of each of the fine pores of the porous membrane is coated with a hygroscopic polymer layer (e.g., a hygroscopic polymer layer 15 of FIG. 1). Since the conventional fuel cell operates under a certain constant level of humidity, it is necessary to maintain a suitable level of humidity. According to an embodiment of the present invention, the hygroscopic polymer layers (e.g., the hygroscopic polymer layers 15 of FIG. 1) included in the polymer electrolyte membrane for the fuel cell absorb water generated from the cathode of the membrane-electrode assembly (MEA) to maintain constant humidity of the polymer electrolyte membrane. Because of this, it is possible to develop a fuel cell that does not require a separate humidifier or a fuel cell that is operable at low temperatures without humidification. In addition, the porous membrane which forms the frame of the polymer electrolyte membrane restrains volume expansion of the polymer electrolyte membrane due to excessive water supply.

In one embodiment of the invention, the hygroscopic polymer layers comprise between 2 and 30% by volume, and preferably between 5 and 20% by volume based on the total volume of the polymer electrolyte membrane for the fuel cell. When the level of the hygroscopic polymer layers is less than 2% by volume, the humidity-maintaining property is deteriorated. Alternatively, when the level is more than 30% by volume, it is impossible to contain a sufficient amount of proton conductive polymers.

The hygroscopic polymer layers preferably have a higher hygroscopicity than that of the proton conductive polymers; more preferably the hygroscopic polymer layers have a hygroscopicity that is at least two times higher, and most preferably a hygroscopicity that is 2 to 50 times higher than the proton conductive polymers.

The hygroscopic polymer layers include a polymer material having a hydrophilic group, and preferably include at least one polymer or copolymer selected from the group consisting of polyvinyl alcohol (PVA), polyethylene oxide (PEO), polypropylene oxide (PPO), polymethylene oxide (PMO), polyethylene oxide methacrylate, polyethylene oxide acrylate, polyethylene oxide dimethacrylate, polyethylene oxide diacrylate, polyhydroxyethylmethyl acrylate (PHEMA), and combinations thereof. The polymer or the copolymer may further include a side chain having a functional group capable of crosslinking. An example of a functional group capable of crosslinking is acrylate capable of crosslinking with polyethylene oxide.

In one embodiment, the polymer electrolyte membrane for the fuel cell includes a proton conductive polymer (e.g., a proton conductive polymer 17 of FIG. 1) in each of the fine pores of the porous membrane coated with the hygroscopic polymer layer. The proton conductive polymers (e.g., the proton conductive polymers 17 of FIG. 1) effectively act as the electrolyte to form an ion transfer channel by three-dimensionally connecting to each other inside the fine pores.

In one embodiment, the proton conductive polymers are present from 18 to 68% and preferably from 30 to 60% by volume based on the total volume of the polymer electrolyte membrane. When the amount of the proton conductive polymers is less than 18% by volume, the proton conductivity is deteriorated. Alternatively, when the amount is more than 68% by volume, the proton conductive polymers may cause volume expansion due to moisture. In one embodiment, the entire pore volume is filled with either hygroscopic polymers or proton conductive polymers. In other words, the sum of the volume of the hygroscopic polymers and the volume of the proton conductive polymers is equal to the pore volume of the porous membrane.

In one embodiment, the proton conductive polymer is a proton conductive polymer that is typically used as a material for an electrolyte membrane for a fuel cell. Exemplary materials include perfluoro-based polymers, benzimidazol-based polymers, polyimide-based polymers, polyether imide-based polymers, polyphenylene sulfide-based polymers, polysulfone-based polymers, polyether sulfone-based polymers, polyether ketone-based polymers, polyether-etherketone-based polymers, polyphenylquinoxaline-based polymers, and combinations thereof. In another embodiment, the proton conductive polymers include poly(perfluorosulfonic acid), poly(perfluorocarboxylic acid), copolymers of fluorovinyl ether and tetrafluoroethylene having sulfonic acid, defluorinated polyether ketone sulfide, aryl ketone, poly(2,2'-(m-phenylene)-5,5'-bibenzimidazole), poly (2,5-benzimidazole), and combinations thereof. However, the proton conductive polymer for the polymer electrolyte membrane for the fuel cell in the present invention is not limited thereto.

A method for preparing a polymer electrolyte membrane for a fuel cell includes: a) preparing a porous membrane formed with a plurality of fine pores; b) coating hygroscopic polymer layers inside the fine pores of the porous membrane; and c) filling proton conductive polymers into the fine pores of the porous membrane coated with the hygroscopic polymer layers.

Suitable porous membranes of above step a) include porous membranes in which open-type fine pores are three-dimensionally connected to each other, and preferably the porous membrane is an unwoven fabric or a thin film in which open-type fine pores are three-dimensionally connected to each other.

Figure 2:
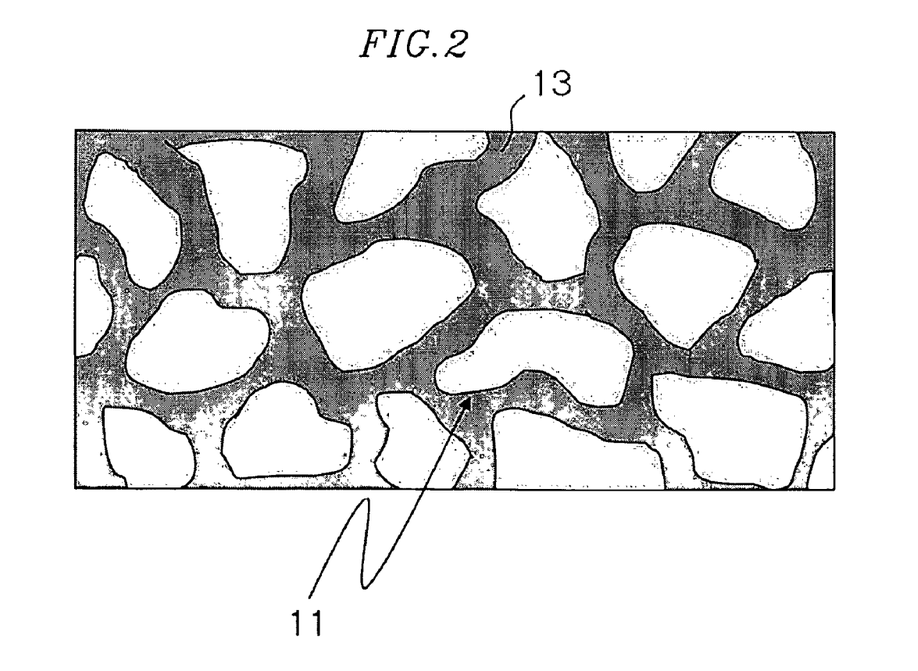
FIG. 2 is a schematic magnified cross-sectional view showing a porous membrane formed with fine pores.

According to the present invention, the process for preparing the thin film or the unwoven fabric may include, but is not limited to, forming fine pores in the thin film by solvent evaporation, extraction, or phase separation, or forming the unwoven fabric by any techniques know to those skilled in the art. For example, the porous membrane can be obtained by coating with a mixed slurry of a fiber, a binder, and a solvent, and evaporating the solvent; or applying a polymer solution in which the polymer is uniformly dissolved in a solvent, and rapidly evaporating the solvent to generate pores; or immersing a polymer solution in which the polymer is uniformly dissolved in a solvent into a different solvent having a low affinity for the polymer, and inducing phase separation. Further, the porous membrane can be obtained by mixing a polymer and a solvent with low volatility or an organic or inorganic substance having a molecular weight of 10,000 or less to make a film, and then immersing it in a solvent capable of dissolving only the solvent with the low volatility, the organic substance or the inorganic substance in order to extract the polymer. In addition, the porous membrane can be obtained by mixing a foaming agent with the polymer to make a film, then inducing a foaming process through heat or photo-irradiation. FIG. 2 is a schematic magnified cross-sectional view showing a porous membrane 13 formed with fine pores 11.

According to one embodiment, the porous membrane (e.g., the porous membrane 13 of FIG. 2) has a porosity between 20 and 70% by volume and preferably between 30 and 60% by volume based on the total volume of the porous membrane. When the porosity is less than 20% by volume, it is difficult to accommodate a sufficient amount of proton conductive polymers in the fine pores. Alternatively, when the porosity is more than 70% by volume, it does not provide a sufficient improvement in the mechanical strength of the porous membrane.

Furthermore, in one embodiment of the invention, the fine pores (e.g., the fine pores 11 of FIG. 2) formed in the porous membrane have an average diameter between 0.1 and 10 µm, and preferably between 1 and 5 µm. When the average diameter of the fine pores is less than 0.1 µm, the polymer electrolyte membrane for the fuel cell does not provide sufficient proton conductivity. Alternatively, when the average diameter is more than 10 µm, the uniformity of the pores is deteriorated and the improvement in the mechanical strength of the porous membrane is minimal.

The porous membrane may be a polymer resin having good mechanical strength and a low hygroscopicity for minimal volume change due to water, and may include at least one polymer or copolymer selected from the group consisting of polyolefin, polyester, polysulfone, polyimide, polyetherimide, polyamide, polytetrafluoroethylene, rayon, glass fiber, and combinations thereof. Preferred materials are rayon and glass fiber.

As mentioned above, a method for preparing a polymer electrolyte membrane for a fuel cell includes coating a hygroscopic polymer layer in each of the fine pores of the porous membrane to maintain a suitable level of moisture by absorbing the water generated from a cathode of an MEA. More particularly, the polymer electrolyte may be prepared by coating the porous membrane with an aqueous or organic solvent-containing solution having 0.5 to 20% by weight, preferably 1 to 5% by weight, of the hygroscopic polymers. When the amount of the hygroscopic polymers is less than 0.5%, the amount of hygroscopic polymers installed in the membrane is too small to absorb enough water. Alternatively, when the amount is more than 20%, the solution is too viscous to properly penetrate into the pores of the membrane. The organic solvent can be an alcohol such as methanol, ethanol, or isopropyl alcohol; an amide such as dimethylacetamide; a sulfoxide such as dimethylsulfoxide; a polar solvent such as N-methylpyrrolidone; an ester; an ether; a carbonate; or combinations thereof.

The coating of the hygroscopic polymer layers may be performed using at least one process selected from the group consisting of dipping, pressure reduced dipping, pressure applied dipping and spraying. Preferably, a pressure reduced dipping process where the porous membrane is dipped into a hygroscopic polymer solution after the fine pores of the porous membrane are vacuumized, or a pressure applied dipping process where the porous membrane is dipped into a hygroscopic polymer solution under high pressure, can be used.

In the coating of the hygroscopic polymer layers, the volume of the hygroscopic polymer layers coated into the fine pores of the porous membrane may be between 2 and 30% by volume, and preferably between 5 and 20% by volume based on the total volume of the polymer electrolyte membrane having a porosity within the aforementioned range. When the amount of the hygroscopic polymer layers is less than 2% by volume, the moisture-maintaining property of the polymer electrolyte membrane of the fuel cell is deteriorated. Alternatively, when the amount is more than 30% by volume, the membrane cannot contain a sufficient amount of the proton conductive polymers.

The hygroscopic polymer layers may be formed with any polymer material having a hydrophilic group, preferably at least one polymer or copolymer selected from the group consisting of polyvinyl alcohol (PVA), polyethylene oxide (PEO), polypropylene oxide (PPO), polymethylene oxide (PMO), polyethylene oxide methacrylate, polyethylene oxide acrylate, polyethylene oxide dimethacrylate, polyethylene oxide diacrylate, polyhydroxy ethylmethylacrylate (PHEMA), and combinations thereof. In addition, the polymer or the copolymer may further include a side chain having a functional group capable of crosslinking, such as an acrylate group capable of crosslinking with a polyethyene oxide.

Figure 3:
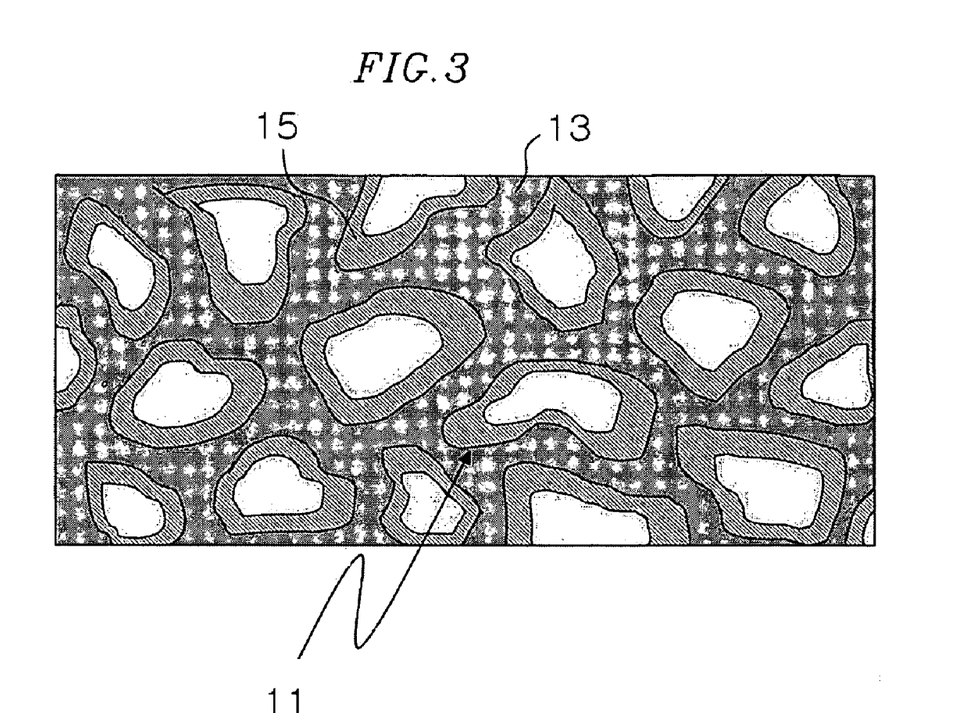
FIG. 3 is a schematic cross-sectional view showing a porous membrane in which the inside of a fine pore is coated with a hygroscopic polymer layer.

FIG. 3 is a schematic magnified view showing the cross-section of a porous membrane 13 having fine pores 11 with hygroscopic polymer layers 15 coated into the fine pores 11.

As mentioned above, a method for preparing a polymer electrolyte membrane for a fuel cell includes filling the inside of each of the fine pores with a proton conductive polymer. The proton conductive polymers in the fine pores effectively act as an electrolyte membrane. The fine pores of the porous membrane may be filled with the proton conductive polymers in an aqueous or organic solvent-containing solution having a concentration of between 2 and 50% by weight, preferably a concentration between 5 and 20% by weight. When the amount of the proton conductive polymers in the solution is less than 2% by weight, not enough proton conductive polymers are filled into the pores so that empty spaces are formed. Alternatively, when the amount is more than 50% by weight, the viscosity of the solution is too high for the solution to enter and fill the pores. Suitable organic solvents are polar organic solvents, such as alcohols such as methanol, ethanol, or isopropyl; amides such as dimethylacetamide or dimethylformamide; sulfoxides such as dimethylsulfoxide, polar solvents such as N-methylpyrrolidone; or combinations thereof. The fine pores may be filled with the proton conductive polymers by a process selected from the group consisting of dipping, pressure reduced dipping, pressure applied dipping, spraying, doctor-blading, silk-screening, lithography transferring, and combinations thereof. In one embodiment, the proton conductive polymers are three-dimensionally connected to each other within the fine pores to form an ion transfer channel.

The fine pores of the polymer electrolyte membrane having a porosity within the aforementioned range may be filled with the proton conductive polymers at an amount of 18 to 68% by volume, and preferably 30 to 60% by volume based on the total volume of the electrolyte membrane. When the amount of the proton conductive polymers is less than 18% by volume based on the total volume of the polymer electrolyte membrane, the proton conductivity is deteriorated. Alternatively, when the amount is more than 68% by volume, it may cause volume expansion due to moisture. In addition, the sum of the volume of the hygroscopic polymers and the volume of the proton conductive polymers is preferably equal to the pore volume of the porous membrane.

A proton conductive polymer of the present invention may comprise any of the proton conductive polymers conventionally used as materials for electrolyte membranes for fuel cells. Exemplary materials for the proton conductive polymers include perfluoro-based polymers, benzimidazole-based polymers, polyimide-based polymers, polyetherimide-based polymers, polyphenylene sulfide-based polymers, polysulfone-based polymers, polyethersulfone-based polymers, polyetherketone-based polymers, polyether-ether ketone-based polymers, polyphenylquinoxaline-based polymers, and combinations thereof. In one embodiment, the proton conductive polymers include poly(perfluorosulfonic acid), poly(perfluorocarboxylic acid), copolymer of fluorovinyl ether and tetrafluoroethylene having sulfonic acid, defluorinated polyether ketone sulfide, aryl ketone, poly(2,2'-(m-phenylene-5,5'-bibenzimidazole)), poly(2,5-benzimidazole), and combinations thereof. However, a proton conductive polymer for the polymer electrolyte membrane for the fuel cell according to the present invention is not limited thereto.

In order to control the thickness of the polymer electrolyte membrane for the fuel cell, a method of the present invention may further include roll pressing.

Hereinafter, examples of the present invention are described. The following examples further illustrate the present invention in more detail, but the present invention is not limited by these examples.

EXAMPLE 1

Preparation of a Polymer Electrolyte Membrane

A polymer electrolyte membrane was prepared using rayon unwoven fabric. The rayon unwoven fabric was formed with fine pores having an average diameter of 5 μm, a porosity of 60% by volume, and a thickness of 20 μm, then hygroscopic polymers of polyvinyl alcohol were dissolved in water at a concentration of 10% by weight to make a solution.

The rayon unwoven fabric was dipped into a prepared polyvinyl alcohol solution of 5% polyvinyl alcohol by volume, then taken out and dried to coat the inside of each of the fine pores with a polyvinyl alcohol layer.

The porous membrane formed with the polyvinyl alcohol layers was then dipped into a solution of 5% by weight of poly(perfluorosulfonic acid) (NAFION®, by DuPont) and taken out and dried to fill the inside of the fine pores with the poly(perfluorosulfonic acid). The above process was repeated several times to uniformly fill the pores with the poly(perfluorosulfonic acid). The poly(perfluorosulfonic acid) made up 55% by volume of the total volume of the polymer electrolyte membrane.

After the above process, an additional rolling process was included to make the thickness of the polymer electrolyte membrane for a fuel cell more uniform.

Figure 4:
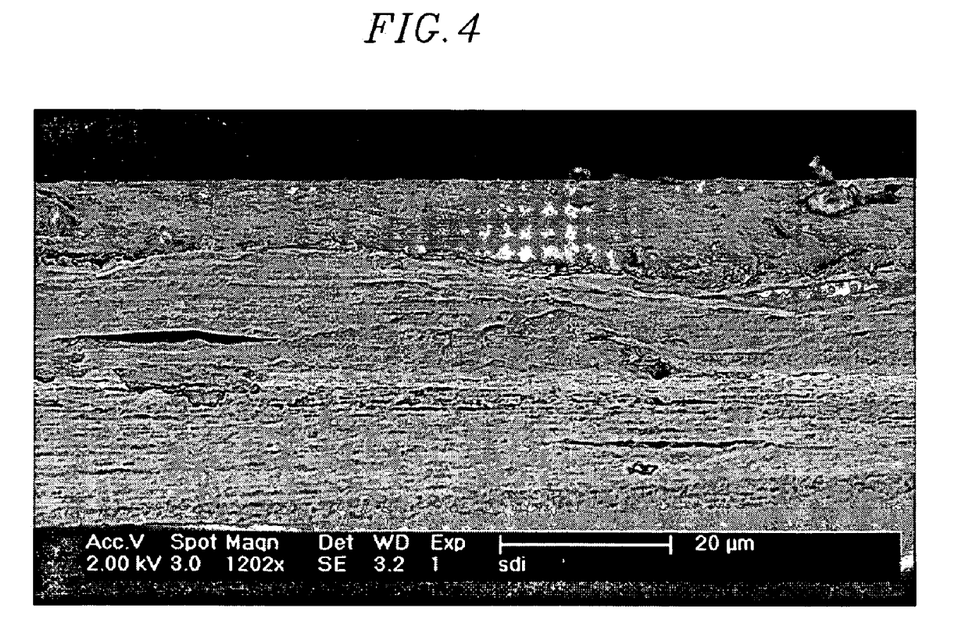
FIG. 4 is a scanning electron microscope (SEM) photograph of a polymer electrolyte membrane produced according to Example 1.

FIG. 4 is an SEM photograph of a polymer electrolyte membrane produced according to Example 1.

EXAMPLE 2

Preparation of a Fuel Cell

A fuel cell was prepared using a polymer electrolyte membrane prepared according to Example 1. The polymer electrolyte membrane was used to form a catalyst layer containing 0.4 mg/cm$^2$ of carbon-supported platinum powder (Pt/C) on its surface, then both outer surfaces were laminated with carbon paper and pressed to make a membrane-electrode assembly (MEA). The resultant MEA was inserted between two sheets of gaskets, which were then inserted between two bipolar plates having a gas pathway channel and a cooling channel of a certain shape, and then compressed between copper end plates to provide a unit cell of the fuel cell.

COMPARATIVE EXAMPLE 1

Preparation of a Polymer Electrolyte Membrane

A polymer electrolyte membrane for a fuel cell was prepared using poly(perfluorosulfonic acid) electrolyte membrane (NAFION®, DuPont) having a thickness of 51 μm.

COMPARATIVE EXAMPLE 2

Preparation of a Fuel Cell

A fuel cell was fabricated using a polymer electrolyte membrane of Comparative Example 1 substantially in accordance with the method in Example 2.

The following Table 1 shows suitable hygroscopicity of the hygroscopic polymers other than the polymer electrolyte membrane used in Example 1 and Comparative Example 1, that can be used in the present invention.

The hygroscopicity (%) of each polymer electrolyte membrane shown in Table 1 was determined by first immersing the polymer electrolyte membrane in water and boiling it to 100° C., then cooing it to 25° C. After removing water from only the surface of the polymer electrolyte membrane, the weight of the polymer electrolyte membrane was measured. The hygroscopicity of the polymer electrolyte membrane was calculated according to the following formula 1.

Hygroscopicity (%)=(weight of water+weight of the membrane)/(weight of membrane)×100      Formula 1

TABLE 1

| | hygroscopic polymer | | | | polymer electrolyte membrane | |
|---|---|---|---|---|---|---|
| | polyvinyl alcohol | polyethylene oxide | polypropylene oxide | polymethylene oxide | polyhydroxyethylmethyl-acrylate | Example 1 | Comparative Example 1 |
| Wt % | 78% | 85% | 71% | 89% | 65% | 55% | 38% |

For the polymer electrolyte membranes prepared according to Example 1 and Comparative Example 1, the resistance of the polymer electrolyte membrane was measured by a two-electrode protocol (and the resistance should be inversely proportional to the proton conductivity). In addition, the Young's modulus of each of the polymer electrolyte membranes was measured using a multi-purpose tester (Instron) to determine the mechanical strength, and volume change after absorbing moisture was also measured.

When the resistance of the electrolyte membrane of Comparative Example 1 is set at 1, the relative resistance of the electrolyte membrane of Example 1 is 0.51. Further, when the mechanical strength of the electrolyte membrane of Comparative Example 1 is set at 1, the relative strength of the electrolyte membrane of Example 1 is 38. In addition, when the volume expansion of the electrolyte membrane of Comparative Example 1 is set at 1, the relative volume expansion of the electrolyte membrane of Example 1 is 0.42.

In view of the foregoing, the electrolyte membrane fabricated by the method of Example 1 according to the present invention has a reduced resistance of 51%, a mechanical strength improved by a factor of 38, and a reduced volume expansion of 42% relative to those of the electrolyte membrane according to Comparative Example 1. Therefore, the electrolyte membrane of the present invention refrains more from volume expansion after absorbing the moisture than that of Comparative Example 1.

For the fuel cell fabricated according to Example 2, hydrogen ($H_2$) gas, and oxygen ($O_2$) gas as an oxidant under a non-humidifying condition were injected, then the voltage and current density of the fuel cell were measured under an operating condition of 60° C. In addition, for the fuel cell fabricated according to Comparative Example 2, hydrogen gas ($H_2$) gas and oxygen ($O_2$) gas under a humidifying condition were injected, then the voltage and the current density of the fuel cell were measured under an operating condition of 60° C.

As a result of the above measurement, the fuel cell of Example 2 having the non-humidified hydrogen ($H_2$) gas and oxygen ($O_2$) gas exhibited a current density of 1.2 A/cm$^2$ at a voltage of 0.6V, while the fuel cell of Comparative Example 2 having the humidified hydrogen ($H_2$) gas and oxygen ($O_2$) gas exhibited a current density of 0.7 A/cm$^2$ at a voltage of 0.6V. As such, the fuel cell of Example 2 having the polymer electrolyte membrane of Example 1 exhibits good performance under non-humidifying conditions.

In general, a polymer electrolyte membrane according to the present invention has superior mechanical strength and hygroscopicity as well as good proton conductivity. In addition, the polymer electrolyte membrane can self-absorb and reuse water generated from a cathode of an MEA, thereby allowing application to a fuel cell having the polymer electrolyte membrane according to the present invention to work in a non-humidifying environment.

While the invention has been described in connection with certain exemplary embodiments, it is to be understood by those skilled in the art that the invention is not limited to the disclosed embodiments, but, on the contrary, is intended to cover various modifications included within the spirit and scope of the appended claims and equivalents thereof.

What is claimed is:

1. A polymer electrolyte membrane for a fuel cell comprising:
    a porous membrane having a plurality of fine pores;
    a hygroscopic polymer layer coated inside each of the fine pores of the porous membrane; and
    a proton conductive polymer filled in each of the fine pores of the porous membrane coated with the hygroscopic polymer layer, wherein the hygroscopic polymer layers comprise a polymer material selected from the group consisting of polyvinyl alcohol (PVA), polyethylene oxide (PEO), polypropylene oxide (PPO), polymethylene oxide (PMO), polyethylene oxide methacrylate, polyethylene oxide acrylate, polyethylene oxide dimethacrylate, polyethylene oxide diacrylate, polyhydroxyethylmethyl acrylate (PHEMA), and combinations thereof.

2. The polymer electrolyte membrane for the fuel cell according to claim 1, wherein the fine pores formed in the porous membrane are open-type fine pores.

3. The polymer electrolyte membrane for the fuel cell according to claim 1, wherein the porous membrane has a porosity between 20 and 70% by volume relative to a total volume of the porous membrane.

4. The polymer electrolyte membrane for the fuel cell according to claim 1, wherein the fine pores formed on the porous membrane have an average diameter between 0.1 and 10 μm.

5. The polymer electrolyte membrane for the fuel cell according to claim 1, wherein the porous membrane comprises a material selected from the group consisting of polyolefin, polyester, polysulfone, polyimide, polyetherimide, polyamide, polytetrafluoroethylene, rayon, glass fiber, and combinations thereof.

6. The polymer electrolyte membrane for the fuel cell according to claim 1, wherein the porous membrane comprises a material selected from the group consisting of rayon and glass fiber.

7. The polymer electrolyte membrane for the fuel cell according to claim 1, wherein the hygroscopic polymer layers are present in an amount from 2 to 30% by volume relative to a total volume of the polymer electrolyte membrane for the fuel cell.

8. The polymer electrolyte membrane for the fuel cell according to claim 1, wherein the hygroscopic polymer layers have a larger hygroscopicity than that of the proton conductive polymers.

9. The polymer electrolyte membrane for the fuel cell according to claim 1, wherein the proton conductive polymers are present in an amount from 18 to 68% by volume relative to a total volume of the polymer electrolyte membrane for the fuel cell.

10. The polymer electrolyte membrane for the fuel cell according to claim 1, wherein the proton conductive polymers comprise polymers selected from the group consisting of perfluoro-based polymers, benzimidazol-based polymers, polyimide-based polymers, polyether imide-based polymers, polyphenylene sulfide-based polymers, polysulfone-based polymers, polyether sulfone-based polymers, polyether ketone-based polymers, polyether-etherketone-based polymers, polyphenyiquinoxaline-based polymers, and combinations thereof.

11. The polymer electrolyte membrane for the fuel cell according to claim 1, wherein the proton conductive polymers comprise at least one material selected from the group consisting of poly(perfluorosulfonic acid), poly(perfluorocarboxylic acid), copolymers of fluorovinyl ether and tetrafluoroethylene containing a sulfonic acid, defluorinated polyether ketone sulfide, aryl ketone, poly(2,2'-(m-phenylene)-5,5'-bibenzimidazole), poly (2,5-benzimidazole), and combinations thereof.

12. A method for preparing a polymer electrolyte membrane for a fuel cell comprising:
preparing a porous membrane formed with a plurality of fine pores;
coating hygroscopic polymer layers inside the fine pores of the porous membrane; and
filling proton conductive polymers into the fine pores of the porous membrane coated with the hygroscopic polymer layers, wherein the hygroscopic polymer layers comprise a material selected from the group consisting of polyvinyl alcohol (PVA), polyethylene oxide (PEO), polypropylene oxide (PPO), polymethylene oxide (PMO), polyethylene oxide methacrylate, polyethylene oxide acrylate, polyethylene oxide dimethacrylate, polyethylene oxide diacrylate, polyhydroxyethylmethyl acrylate (PHEMA), and combinations thereof.

13. The method for preparing the polymer electrolyte membrane for the fuel cell according to claim 12, wherein the pores formed on the porous membrane are open-type fine pores.

14. The method for preparing the polymer electrolyte membrane for the fuel cell according to claim 12, wherein the porous membrane has a porosity of between 20 and 70% by volume relative to a total volume of the porous membrane.

15. The method for preparing the polymer electrolyte membrane for the fuel cell according to claim 12, wherein the fine pores formed on the porous membrane have an average diameter between 0.1 and 10 μm.

16. The method for preparing the polymer electrolyte membrane for the fuel cell according to claim 12, wherein the porous membrane comprises a material selected from the group consisting of polyolefin, polyester, polysulfone, polyimide, polyetherimide, polyamide, polytetrafluoroethylene, rayon, glass fiber, and combinations thereof.

17. The method for preparing the polymer electrolyte membrane for the fuel cell according to claim 12, wherein the porous membrane comprises a material selected from the group consisting of rayon and glass fiber.

18. The method for preparing the polymer electrolyte membrane for the fuel cell according to claim 12, wherein the coating of the fine pores with the hygroscopic polymer layers is performed using an aqueous solution comprising 0.5 to 20% by weight of the hygroscopic polymer.

19. The method for preparing the polymer electrolyte membrane for the fuel cell according to claim 12, wherein the coating of the fine pores with the hygroscopic polymer layers is performed using at least one process selected from the group consisting of dipping, pressure reduced dipping, pressure applied dipping and spraying.

20. The method for preparing the polymer electrolyte membrane for the fuel cell according to claim 12, wherein the hygroscopic polymer layers are provided in an amount between 2 and 30% by volume based on a total volume of the polymer electrolyte membrane.

21. The method for preparing the polymer electrolyte membrane for the fuel cell according to claim 12, wherein the filling of the coated fine pores with the proton conductive polymers is performed using an aqueous solution comprising from 2 to 50% of the proton conductive polymer by weight.

22. The method for preparing the polymer electrolyte membrane for the fuel cell according to claim 12, wherein the filling of the coated fine pores with the proton conductive polymer is performed by a process selected from the group consisting of dipping, pressure reduced dipping, pressure applied dipping, spraying, doctor-blading, silk-screening, lithography transferring, and combinations thereof.

23. The method for preparing the polymer electrolyte membrane for the fuel cell according to claim 12, wherein the proton conductive polymer are present in an amount from 18 to 68% by volume relative to a total volume of the polymer electrolyte membrane.

24. The method for preparing the polymer electrolyte membrane for the fuel cell according to claim 12, wherein the proton conductive polymers comprise a material selected from the group consisting of perfluoro-based polymers, benzimidazol-based polymers, polyimide-based polymers, polyether imide-based polymers, polyphenylene sulfide-based polymers, polysulfone-based polymers, polyether sulfone-based polymers, polyether ketone-based polymers, polyether-etherketone-based polymers, polyphenylquinoxaline-based polymers, and combinations thereof.

25. The method for preparing the polymer electrolyte membrane for the fuel cell according to claim 12, wherein the proton conductive polymers comprise a material selected from the group consisting of poly(perfluorosulfonic acid), poly(perfluorocarboxylic acid), copolymer of fluorovinyl ether and tetrafluoroethylene containing a sulfonic acid, defluorinated polyether ketone sulfide, aryl ketone, poly(2,2'-(m-phenylene)-5,5'-bibenzimidazole), poly(2,5-benzimidazole), and combinations thereof.

* * * * *

UNITED STATES PATENT AND TRADEMARK OFFICE
CERTIFICATE OF CORRECTION

PATENT NO. : 7,452,621 B2  Page 1 of 1
APPLICATION NO. : 11/153699
DATED : November 18, 2008
INVENTOR(S) : Hee-Tak Kim It is certified that error appears in the above-identified patent and that said Letters Patent is hereby corrected as shown below:

Column 11, line 33, Claim 10    Delete "polyphenyiquinoxaline-based",
                                 Insert --polyphenylquinoxaline-based--

Column 12, line 34, Claim 22    Delete "polymer",
                                 Insert --polymers--

Column 12, line 45, Claim 23    Delete "polymer",
                                 Insert --polymers--

Signed and Sealed this

Twenty-fourth Day of February, 2009

JOHN DOLL
*Acting Director of the United States Patent and Trademark Office*